United States Patent [19]

Binder et al.

[11] 4,449,160

[45] May 15, 1984

[54] ARRANGEMENT FOR HOLDING A PART ATTACHED TO A SUPPORT FRAME HELD AGAINST A ROTATABLE MEMBER WHICH IS MOUNTED WITHIN THAT SUPPORT FRAME

[75] Inventors: Jean-Jacques Binder, Valdoie; Jean G. Magnenet, Belfort, both of France

[73] Assignee: Compagnie Internationale pour l'Informatique Cii-Honeywell Bull (Societe Anonyme), Paris, France

[21] Appl. No.: 966,576

[22] Filed: Dec. 5, 1978

[30] Foreign Application Priority Data

Mar. 24, 1978 [FR] France .............................. 78 08617

[51] Int. Cl.³ .................. G11B 21/16; G11B 5/56; G11B 21/24; E04G 3/00
[52] U.S. Cl. .................................. 360/104; 360/109; 248/279
[58] Field of Search ................. 360/104, 109; 248/279

[56] References Cited

U.S. PATENT DOCUMENTS

| 3,011,855 | 12/1961 | Kirby | 360/109 |
| 3,039,102 | 6/1962 | Fuller et al. | 360/109 |
| 3,227,816 | 1/1966 | Willis | 360/109 |
| 3,975,770 | 8/1976 | Spash et al. | 360/109 |

FOREIGN PATENT DOCUMENTS 1178598  6/1957  France .
1377100 12/1963  France .

Primary Examiner—Robert S. Tupper
Attorney, Agent, or Firm—Kerkam, Stowell, Kondracki & Clarke

[57] ABSTRACT

A part which is attached to a support frame is pressed against a rotatable member mounted within that support frame. An element having four degrees of freedom is mounted between the support and a point on the part. A biasing element is mounted between the support and a second point on the part to urge the part against the movable member. The structure is useful in the recording of data on a magnetic recording machine and impactless magnetic printing machines.

9 Claims, 3 Drawing Figures

|    | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ | $b_{13}$ | $b_{14}$ | $B_1$ | $B_2$ | $B_3$ | $B_4$ | $B_5$ | $B_6$ | $B_7$ | $B_8$ |
|----|---|---|---|---|---|---|---|---|---|---|---|---|---|---|---|---|---|---|---|---|---|---|
| S1 | P | 0 | 0 | 0 | 0 | 0 | 0 | 0 | W | X | Y | Z | Ø | Ø | P | 0 | 0 | 0 | W | X | Y | Z |
| S2 | P | 0 | 0 | 0 | 0 | 0 | 0 | 1 | W | X | Y | Z | Ø | Ø | P | 0 | 0 | 1 | W | X | Y | Z |
| S3 | P | 0 | 0 | 0 | 0 | 0 | 1 | W | X | Y | Z | Ø | Ø | Ø | P | 0 | 1 | 0 | W | X | Y | Z |
| S4 | P | 0 | 0 | 0 | 0 | 1 | W | X | Y | Z | Ø | Ø | Ø | Ø | P | 0 | 1 | 1 | W | X | Y | Z |
| S5 | P | 0 | 0 | 0 | 1 | W | X | Y | Z | Ø | Ø | Ø | Ø | Ø | P | 1 | 0 | 0 | W | X | Y | Z |
| S6 | P | 0 | 0 | 1 | W | X | Y | Z | Ø | Ø | Ø | Ø | Ø | Ø | P | 1 | 0 | 1 | W | X | Y | Z |
| S7 | P | 0 | 1 | W | X | Y | Z | Ø | Ø | Ø | Ø | Ø | Ø | Ø | P | 1 | 1 | 0 | W | X | Y | Z |
| S8 | P | 1 | W | X | Y | Z | Ø | Ø | Ø | Ø | Ø | Ø | Ø | Ø | P | 1 | 1 | 1 | W | X | Y | Z |

FIG. 1

|    | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ | $b_{13}$ | $b_{14}$ | $B_1$ | $B_2$ | $B_3$ | $B_4$ | $B_5$ | $B_6$ | $B_7$ | $B_8$ |
|----|---|---|---|---|---|---|---|---|---|---|---|---|---|---|---|---|---|---|---|---|---|---|
| S1 | P | 0 | 0 | 0 | 0 | 0 | 0 | 0 | 1 | W | X | Y | Z | Ø | P | 0 | 0 | 0 | W | X | Y | Z |
| S2 | P | 0 | 0 | 0 | 0 | 0 | 0 | 1 | W | X | Y | Z | Ø | Ø | P | 0 | 0 | 1 | W | X | Y | Z |
| S3 | P | 0 | 0 | 0 | 0 | 0 | 1 | W | X | Y | Z | Ø | Ø | Ø | P | 0 | 1 | 0 | W | X | Y | Z |
| S4 | P | 0 | 0 | 0 | 0 | 1 | W | X | Y | Z | Ø | Ø | Ø | Ø | P | 0 | 1 | 1 | W | X | Y | Z |
| S5 | P | 0 | 0 | 0 | 0 | W | X | Y | Z | Ø | Ø | Ø | Ø | Ø | P | 1 | 0 | 0 | W | X | Y | Z |
| S6 | P | 0 | 0 | 1 | W | X | Y | Z | Ø | Ø | Ø | Ø | Ø | Ø | P | 1 | 0 | 1 | W | X | Y | Z |
| S7 | P | 0 | 1 | W | X | Y | Z | Ø | Ø | Ø | Ø | Ø | Ø | Ø | P | 1 | 1 | 0 | W | X | Y | Z |
| S8 | P | 1 | W | X | Y | Z | Ø | Ø | Ø | Ø | Ø | Ø | Ø | Ø | P | 1 | 1 | 1 | W | X | Y | Z |

FIG. 2

ARRANGEMENT FOR HOLDING A PART ATTACHED TO A SUPPORT FRAME HELD AGAINST A ROTATABLE MEMBER WHICH IS MOUNTED WITHIN THAT SUPPORT FRAME

BACKGROUND OF THE INVENTION

The present invention relates to an arrangement which enables a part which is attached to a support frame to be held pressed against a rotatable member which is mounted within that support frame. This arrangement is applicable particularly, but not exclusively, to apparatus which is used to record data on a magnetic recording medium, and to impactless magnetic printing machines.

Data recording apparatus and printing machines of this kind generally have a recording medium which is formed by a carrier coated with a layer of magnetic material, which carrier may take various forms, being for example in the form of a drum, a flexible tape or a disc. Data is recorded on this recording medium by means of at least one magnetic recording head adjacent to the moving recording medium. To insure that the recording medium is properly magnetized and to avoid, in particular, the undesirable effects caused by stray magnetic flux from the head, it is essential for the distance which separates the head from the recording medium to remain constant and less than a predetermined limiting value which, in present-day applications, has been found to be equal to a few microns. Setting the head and the recording medium to maintain this distance as constant as possible has always proved a difficult problem to solve, and this has resulted in practice in the head being placed in contact with the recording medium.

Thus, in known recording apparatus such for example as that which is described and illustrated in French Patent Specification No. 1,322,983, the recording medium is formed by a flexible magnetic card which is held against the recording head while being moved past the head by pneumatic suction. This solution, which is perfectly suitable in cases where the recording medium is relatively flexible, is not suitable when the recording medium is rigid and indeformable, as it is, for example, when it is formed by a drum. In the case of a drum it is in fact virtually impossible to obtain perfect contact between the recording head and the drum, by reason of the fact that the drum, despite all the care taken in its manufacture, often has structural defects such as eccentricities or surface irregularities which, even though small, prevent all the points of the sliding surface of the head from being in simultaneous contact with the drum.

This disadvantage is even more noticeable when the recording apparatus or the printing machine has a plurality of recording heads which are arranged one beside the other along a generatrix of the drum and which are combined into a single assembly. When this is the case it is in fact no longer possible to obtain perfect contact between all of the heads and the surface of the drum. This disadvantage could be overcome by mounting each head separately on a resilient support in such a way as to enable the head to be forced against the surface of the drum, but with this solution it would not be possible to prevent the heads from performing relatively large translatory movements in relation to the fixed parts of the machine both in the direction of movement of the drum and in a direction parallel to the axis of rotation of the drum. Consequently, this solution would be incompatible with the need for precise positioning of the items of data recorded on the drum.

BRIEF SUMMARY OF THE INVENTION

The present invention overcomes all of these disadvantages and provides a simple and inexpensive arrangement which enables a part attached to a support frame to be held pressed against a rotatable member which is mounted within that support frame without the part thereby undergoing translatory movement in relation to the support. in the case of data recording apparatus or an impactless magnetic printing machine, the rotatable member may be formed by a recording drum or a magnetic recording tape, while the part may be formed by a magnetic recording head.

One aspect of the present invention relates to an arrangement for holding a part attached to a support pressed against a member which is movable in relation to the support, this arrangement comprising an universal joint having four degrees of freedom which is mounted between the support and a first point on the part to ensure attachment of the latter to the support and to enable that part to be moved towards the member, and a return element arranged between the support and a second point on the part to urge the latter against the movable member.

BRIEF DESCRIPTION OF THE DRAWINGS

Other objects and advantages of the invention will become apparent from the following description, which is given by way of non-limiting but preferred example, and with reference to the accompanying drawings, in which.

DESCRIPTION OF THE PREFERRED EMBODIMENT

Figure 1:
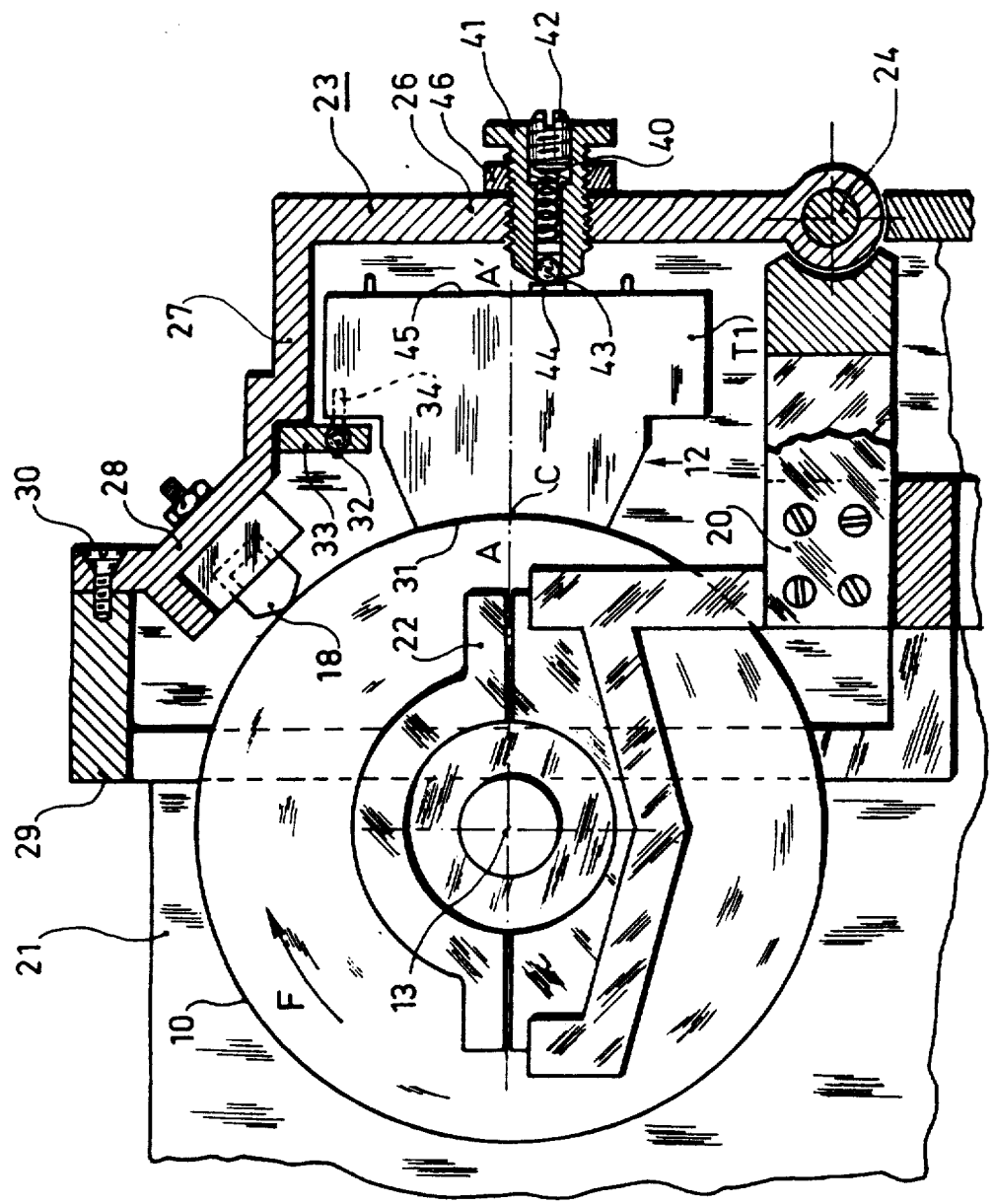
FIG. 1 is a partial schematic view in elevation of a data recording apparatus provided with an arrangement constructed in accordance with the invention.

The recording apparatus of which part is shown schematically in FIG. 1 comprises a recording medium which is formed, in the embodiment being described, by a magnetic drum 10 which is mounted on a horizontal axis 13. Drum 10 is driven in rotation in the direction of arrow F by a known drive means such as an electric motor (not shown). Data is recorded on the drum by a magnetic recording member 12 which is situated close to the outer surface of drum 10.

Figure 2:
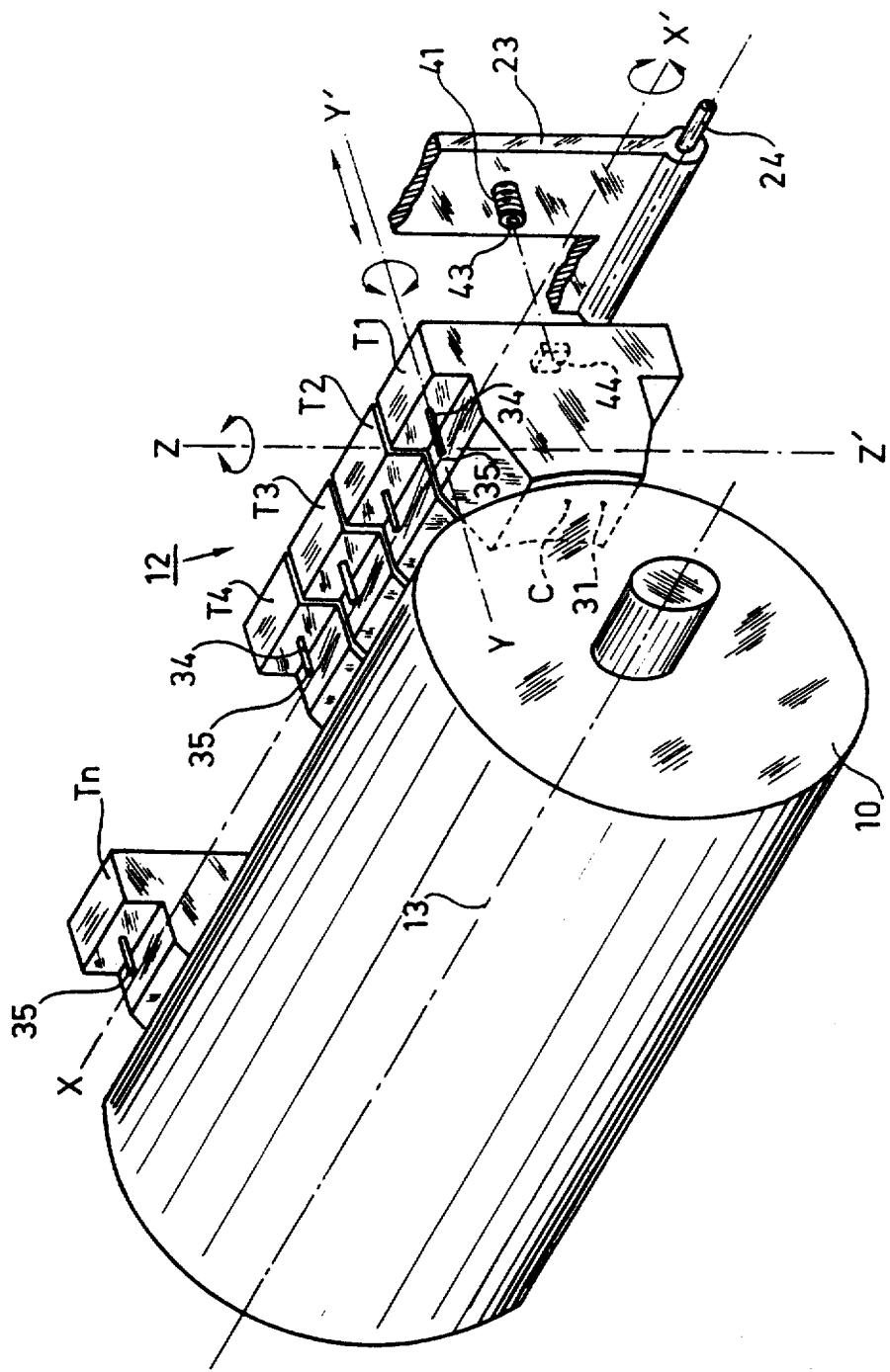
FIG. 2 is a perspective view showing the method of articulating the recording heads of the apparatus shown in FIG. 1.
Figure 3:
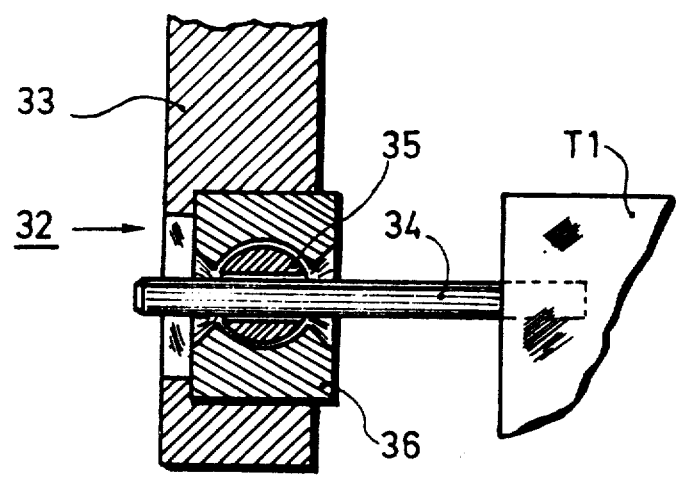

As can be seen in FIG. 2, recording member 12 is formed by a group of modules T1, T2, T3 ... Tn, which are arranged one beside the other in a line parallel to the axis of rotation 13 of drum 10. Each module contains a plurality of magnetic recording heads which are housed within the module and which are of a known kind, such as is incidentally described in French Patent Specification No. 2,298,850 and corresponding U.S. application Ser. No. 854,682, filed in the name of Jean Georges Magnenet on Nov. 25, 1977 as a continuation of Ser. No. 651,156, now abandoned, and which are assigned to the assignee of the present invention. When energized at various times by an electric current, each of these heads generates a variable magnetic field the effect of which is to create magnetized zones on the surface of the drum which passes in front of the heads.

The magnetized zones of drum 10, which thus represent the data recorded on the drum, may then be read by means of a reading member of a known kind (not shown) and then erased when they pass in front of a magnetic erasing member 18 of a known kind. The portion of drum 10 which has been erased in this way by erasing member 18 is demagnetized and is able to receive new data when it again arrives in front of recording member 12.

FIG. 1 also shows that drum 10 and magnetic recording and erasing members 12 and 18 are accommodated within a housing comprising a support frame 20 fitted with two sidepieces of which only one, shown at 21, is seen in FIG. 1. Horizontal shaft 13 on which drum 10 rotates is supported at its ends by two bearings of which only one, shown at 22, is visible in FIG. 1. Bearings 22 are fixed to support frame 20. Magnetic recording and erasing member 12 and 18 are mounted on a support piece 23 pivoting about a shaft 24 arranged parallel to the axis of rotation 13 of the drum and secured to support frame 20. Support piece 23 which, as can be seen in FIG. 1, is substantially in the shape of an inverted L, has a vertical part 26 which continues into a horizontal part 27. Horizontal part 27 in turn continues into an extension 28 which, when support piece 23 is in its normal position, the position shown in FIG. 1, bears against a horizontal bearer bar 29 fixed to the upper part of the apparatus. Support piece 23 is held in normal position by a suitable holding device such as a screw 30.

With reference to FIGS. 1 and 2, it can be seen that each of modules T1, T2, T3 ... Tn of recording number 12 is in the form of a block having a face orientated towards magnetic drum 10 machined to form a sliding surface 31 which is normally pressed against the outer surface of the drum as shown in FIG. 1. In the embodiment illustrated by FIGS. 1 and 2, sliding surface 31 is a concave surface forming part of a cylinder whose radius is substantially the same as that of magnetic drum 10. Each of modules T1, T2, T3 ... Tn has an axis of symmetry AA' which, as indicated in FIG. 1, passes through the centre C of sliding surface 31 of the module and is perpendicular to a plane tangent to this surface at C. As shown in FIG. 1, axis of symmetry AA' also passes through the axis of rotation 13 of drum 10 and is thus also perpendicular to the axis of rotation of the rotatable member or drum 10. Each module is suspended at its upper part from horizontal part 27 of support piece 23 by an universal joints 32 having four degrees of freedom.

The term "universal joints having four degrees of freedom" refers to an universal joints which enables each module to pivot about three axes lying at right-angles to one another and to undergo translatory movement along one of these three axes to bear against the drum. Thus, module T1, for example, is able to pivot about three axes at right-angles to one another which are shown at XX', YY', ZZ' respectively in FIG. 2, axis XX' being a horizontal axis which is parallel to the axis of rotation of the drum; axis YY' being a horizontal axis perpendicular to XX'; and axis ZZ' being a vertical axis which is perpendicular to axis XX' and to axis YY'. Module T1 is also able to move in translation along axis YY', which axis is perpendicular to a plane tangent to sliding surface 31 at C.

Figure 3:
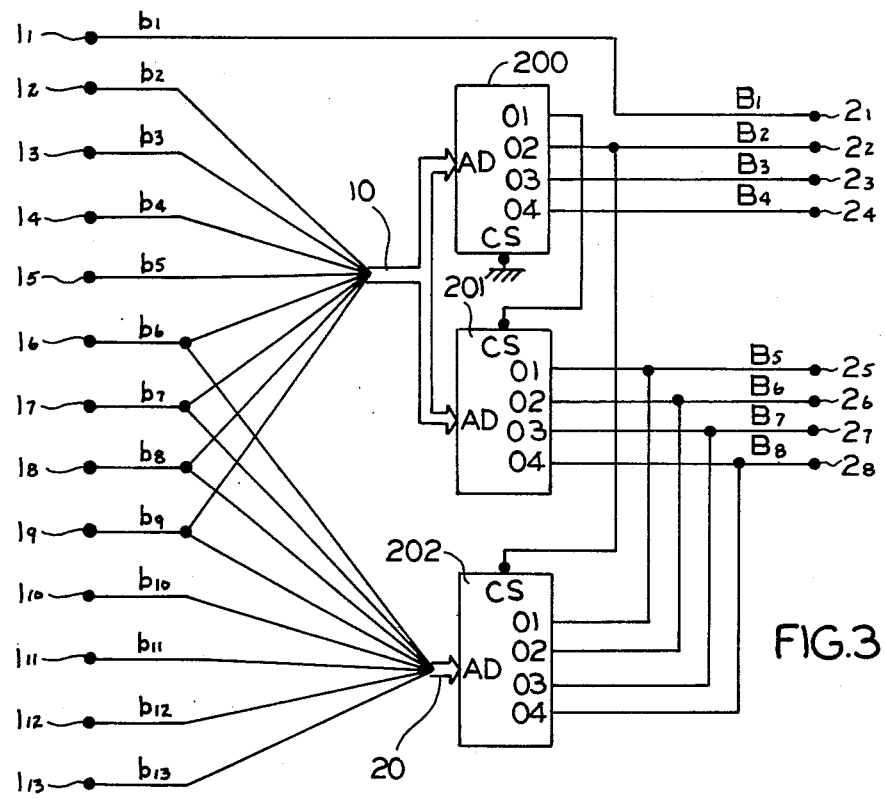
FIG. 3 is a detailed view of one of the universal joints which are used to articulate the recording heads of the apparatus shown in FIG. 1.
Figure 4:
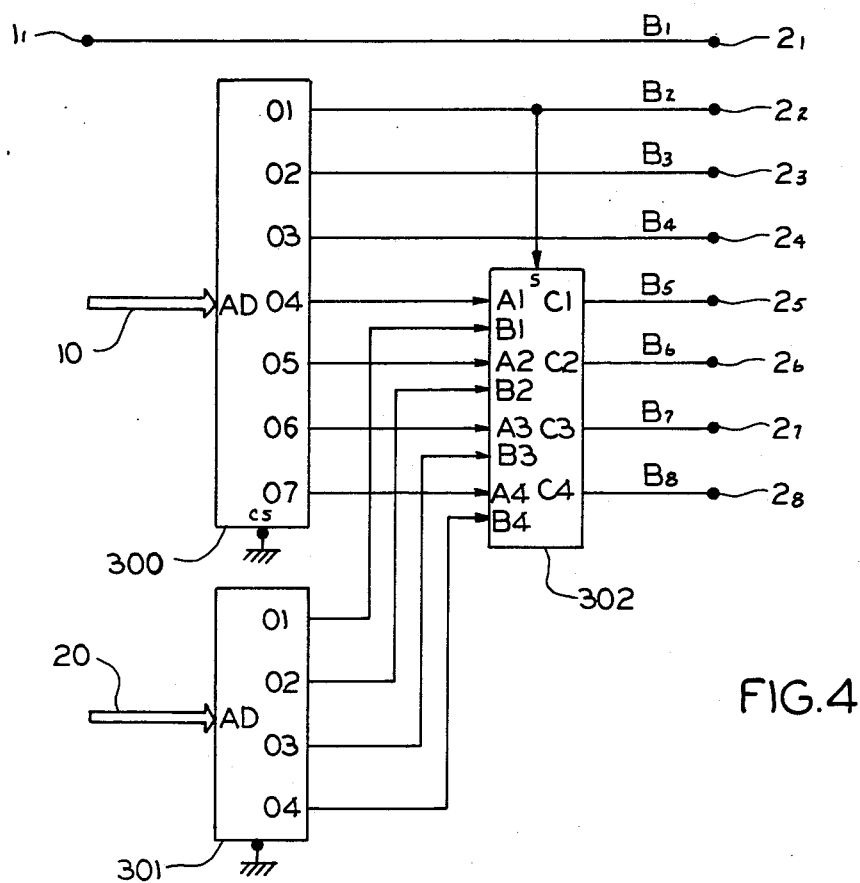
Figure 5:
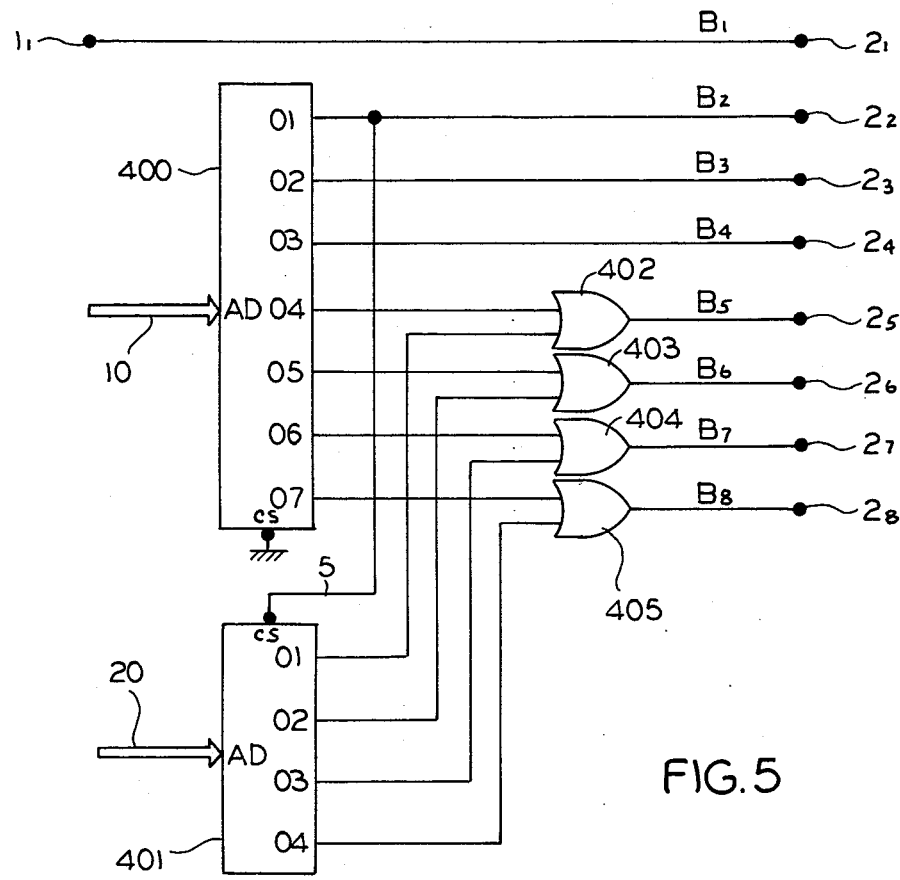
Figure 6:
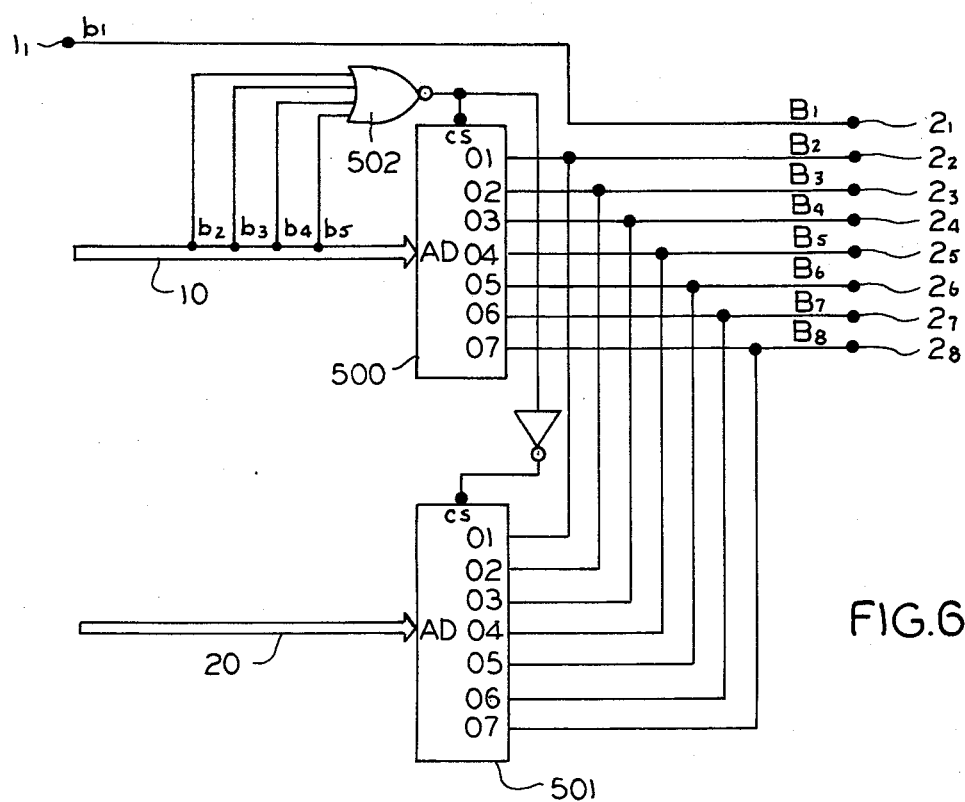
Figure 7:
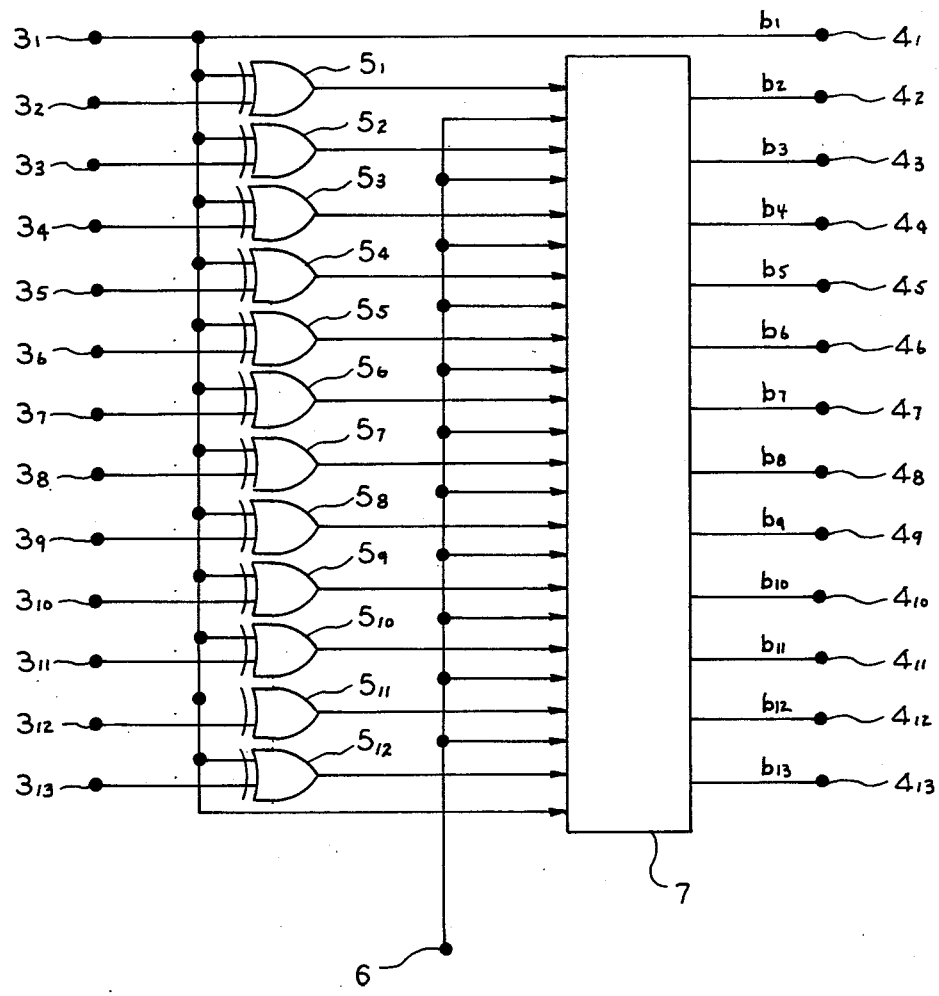

In the embodiment illustrated in FIG. 3, universal joints 32 having four degrees of freedom is formed by a ball-joint having a socket part 36 mounted in an attachment piece 33 fixed to part 27 of support piece 23 (FIG. 1), having a spherical part 35 through which a rod 34 passes which rod is inset in the corresponding module and slides in spherical part 35. It should be noted that this ball-joint is not a limitation of the present invention and that the universal joint having four degrees of freedom could have a totally different form, such as a system comprising a Cardan joint having three degrees of freedom and attached to the end of a shaft which is mounted to turn and slide in a bearing.

In FIG. 2, for reasons of simplicity, only spherical parts 35 of the various ball-joints which provide articulation for modules T1, T2, T3 ... Tn are shown. Each of these spherical parts has, passing through it, rod 34 of the corresponding module. All of the ball-joints are identical and, as can be seen in FIG. 2, all spherical parts 35 of the ball-joints are aligned along axis XX' described above. Under these conditions, when all the modules T1, T2, T3 ... Tn are pressed against the surface of the drum, in a manner which will be described hereinafter, none of the modules can undergo translation along axis XX' or along axis ZZ', which enables the items of data recorded on the drum to be precisely positioned. In particular, if all the magnetic heads, which are situated at the same distance from the axis XX', are energized simultaneously for a brief instant, a series of magnetized points would be obtained on the surface of drum 10 which would all be situated along the same generatrix of the drum.

Each module, being provided with an universal joint having four degrees of freedom which is mounted, as can be seen, between a first point on the module and support piece 23, the module is applied to magnetic drum 10 by a return or biassing element which is arranged between support piece 23 and a second point on the module. In the embodiment being described, this return or biassing element is formed, as can be seen in FIG. 1, by a compression spring 40 which is housed in a socket 41. Socket 41 is provided with a thread and is screwed into vertical part 26 of support piece 23. Spring 40 is retained at one end by a set screw 42 and at the other end it exerts a force on a ball-bearing 43 which is thus pressed against a pressure pad 44 which is fixed to a face 45 of the module opposite sliding surface 31. By means of its thread, socket 41, by a simple screwing action, can be moved in the direction of drum 10 and, when so moved, moves the module forward until sliding surface 31 of the module comes into contact with the surface of the drum. When the module has been positioned in this way, a lock-nut 46 mounted on the threaded part of socket 41 can be used to lock the socket in position. Then, by acting on set screw 42 it is possible to adjust the force which the ball-bearing 43 exerts on the module to a predetermined value.

It is assumed that in the embodiment being described this force is between substantially one and two newtons. This value is not a limitation of the present invention, however, and in other embodiments the force exerted by the return or biassing element could have different values. Similarly, the return element, instead of being a compression spring, could be of some other form, for example, a pressure member which exerts a thrust under the tractive effect of a cable attached at one end to the pressure member with the cable passing over a return pulley and carrying a weight at its other end. An arrangement of this kind is described incidentally in French Patent Specification No. 1,469,183.

In the embodiment being described where the module which is applied to magnetic drum 10 has an axis of symmetry AA' perpendicular to a tangent to sliding surface 31 at C, the point of articulation 35 of ball-joint 32 and the point on the module against which the force from the return element is exerted are situated on either side of this axis of symmetry AA', as can be seen in FIG. 1. In the embodiment illustrated in FIG. 2, the point of articulation 35 and the scoket 41 for one module are situated substantially in the same plane, this plane being defined by the axes YY', ZZ' which pass through point 35.

In the embodiment described above, each module has its own point of articulation, which enables it, when it is moved towards the drum by the return element, to remain at all times in contact with the surface of the drum despite any slight irregularities of this surface, the oscillatory movements performed by the module about its point of articulation having no effect on the adjoining modules.

Since support piece 23 pivots about shaft 24, the operator, having unscrewed screw 30, is able to tilt support piece 23, which provides easy access to the modules already in place in the apparatus to allow them to be checked and possibly replaced.

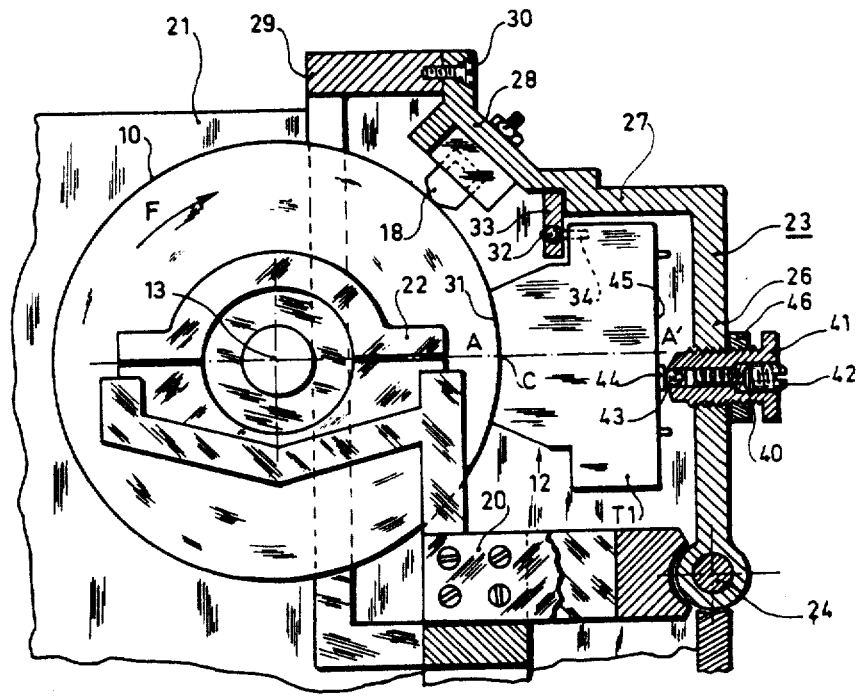

What is claimed is:

1. In a mechanical apparatus comprising a rigid support frame, a rotatable member mounted within said support frame and a part attached to said support frame, and provided with a sliding surface in contact with said rotatable member, said part having an axis of symmetry perpendicular to said sliding surface and the axis of rotation of said rotatable member, an arrangement for holding said part pressed against said rotatable member, said arrangement comprising:

an universal joint means disposed between said support frame and a first point of said part to attach said part to said support frame, said universal joint means further allowing said part to move in translation in a direction perpendicular to said sliding surface, and a return spring element between said support frame and a second point of said part to urge said part against said rotatable member, said first and second points being disposed on opposite sides of the axis of symmetry of said part.

2. Arrangement according to claim 1, said return spring element being a preset compression spring.

3. An arrangement according to claim 1, wherein said universal joint means comprises a socket part fixed to the support frame, a ball held slidably within said socket and provided with an aperture extending diametrally through said ball, and a rod slidably disposed in said aperture and fixed to the first point of the part.

4. In a mechanical apparatus comprising a rigid support frame, a cylinder mounted within said support frame and adapted to be driven in rotation about an axis of rotation, and a part attached to said support frame and provided with a sliding surface in contact with said cylinder, said part having an axis of symmetry perpendicular to said sliding surface and said axis of rotation an arrangement for holding said part pressed against said cylinder, said arrangement comprising:

an universal joint means disposed between said support frame and a first point of said part to attach said part to said support frame, said universal joint means further allowing said part to move in translation in a direction perpendicular to said sliding surface, and a spring disposed between said support frame and a second point of said part to urge said part against said cylinder, said first and second points being disposed on opposite sides of the axis of symmetry of said part and in a plane which passes through said axis of symmetry and which is perpendicular to said axis of rotation of said cylinder.

5. Arrangement according to claim 4, said spring being a preset compression spring.

6. In an apparatus comprising a rigid support frame, a magnetic drum mounted within said support frame and adapted to be driven in rotation about its axis of rotation, and a magnetic head attached to said support frame and provided with a sliding surface in contact with said magnetic drum, said head having an axis of symmetry perpendicular to said sliding surface and said axis of rotation, an arrangement for holding said head pressed against said drum, said arrangement comprising:

an universal joint means disposed between said support frame and a first point of said head to attach said head to said support frame, said universal joint means further allowing said head to move in translation in a direction perpendicular to said sliding surface and a spring disposed between said support frame and a second point of said head to urge said head against said drum, said first and second points being disposed on opposite sides of the axis of symmetry of said head and in a plane which passes through said axis of symmetry and which is perpendicular to said axis of rotation of said drum.

7. An arrangement according to claim 6, wherein said universal joint means comprises a socket part fixed to the support frame, a ball held slidably within said socket and provided with an aperture extending diametrally through said ball, and a rod slidably disposed in said aperture and fixed to the first point of the head.

8. In an apparatus comprising a rigid support frame, a magnetic drum mounted within said support frame and adapted to be driven in rotation about its axis of rotation, and a transducer assembly comprising a row of separate modules, each of said modules containing a plurality of magnetic heads which are housed within said module, said modules being disposed side by side and in a line parallel to said axis of rotation of said drum, each of said modules is attached to said support frame and is provided with a sliding surface in contact with said magnetic drum, and each module has an axis of symmetry which is perpendicular to the sliding surface of said module and said axis of rotation, an arrangement for holding each of said modules pressed against said drum, comprising:

a number of universal joint means equal to the number of said modules, each of said joint means being associated with a respective module and being disposed between said support frame and a first point of the associated module to attach said associated module to said support frame, each of said universal joint means being further adapted to enable the associated module to move in translation in a direction perpendicular to the sliding surface of said associated module, and a number of springs equal to the number of said modules, each of said springs being associated with a respective module and being disposed between said support frame and a second point of the associated module to urge said associated module against said drum; said first and second points of each module being disposed on opposite side of the axis of symmetry of that module and in a plane which passes through said axis of symmetry and which is perpendicular to said axis of rotation of said drum.

9. An arrangement according to claim 8, wherein each universal joint means comprises a socket part fixed to the support frame, a ball held being slidably within said socket and provided with an aperture extending diametrally through said ball, and a rod slidably disposed in said aperture and fixed to the first point of the associated module.

* * * * *

UNITED STATES PATENT AND TRADEMARK OFFICE
CERTIFICATE OF CORRECTION

PATENT NO. : 4,449,160

DATED : May 15, 1984

INVENTOR(S) : Jean-Jacques Binder et al.

It is certified that error appears in the above-identified patent and that said Letters Patent is hereby corrected as shown below:

The title page should be deleted to appear as per attached title page.

Sheets 1 through 4 of the drawings should be deleted and Sheets 1 through 3 as per attached substituted therefor.

Signed and Sealed this

Seventeenth Day of July 1984

[SEAL]

Attest:

GERALD J. MOSSINGHOFF

*Attesting Officer*  *Commissioner of Patents and Trademarks*

United States Patent [19]

Binder et al.

[11] 4,449,160
[45] May 15, 1984

[54] ARRANGEMENT FOR HOLDING A PART ATTACHED TO A SUPPORT FRAME HELD AGAINST A ROTATABLE MEMBER WHICH IS MOUNTED WITHIN THAT SUPPORT FRAME

[75] Inventors: Jean-Jacques Binder, Valdoie; Jean G. Magnenet, Belfort, both of France

[73] Assignee: Compagnie Internationale pour l'Informatique Cii-Honeywell Bull (Societe Anonyme), Paris, France

[21] Appl. No.: 966,576

[22] Filed: Dec. 5, 1978

[30] Foreign Application Priority Data

Mar. 24, 1978 [FR] France ............................. 78 08617

[51] Int. Cl.³ .................. G11B 21/16; G11B 5/56; G11B 21/24; E04G 3/00
[52] U.S. Cl. ................................. 360/104; 360/109; 248/279
[58] Field of Search ................. 360/104, 109; 248/279

[56] References Cited

U.S. PATENT DOCUMENTS

| | | | |
|---|---|---|---|
| 3,011,855 | 12/1961 | Kirby | 360/109 |
| 3,039,102 | 6/1962 | Fuller et al. | 360/109 |
| 3,227,816 | 1/1966 | Willis | 360/109 |
| 3,975,770 | 8/1976 | Spash et al. | 360/109 |

FOREIGN PATENT DOCUMENTS 1178598  6/1957  France .
1377100 12/1963  France .

Primary Examiner—Robert S. Tupper
Attorney, Agent, or Firm—Kerkam, Stowell, Kondracki & Clarke

[57] ABSTRACT

A part which is attached to a support frame is pressed against a rotatable member mounted within that support frame. An element having four degrees of freedom is mounted between the support and a point on the part. A biasing element is mounted between the support and a second point on the part to urge the part against the movable member. The structure is useful in the recording of data on a magnetic recording machine and impactless magnetic printing machines.

9 Claims, 3 Drawing Figures